United States Patent
Lee et al.

(10) Patent No.: US 10,360,427 B2
(45) Date of Patent: Jul. 23, 2019

(54) TOUCH CONTROL APPARATUS WITH FINGERPRINT IDENTIFICATION FUNCTION

(71) Applicant: TPK Touch Solutions (Xiamen) Inc., Xiamen (CN)

(72) Inventors: Yuh-Wen Lee, Zhubei (TW); Yau-Chen Jiang, Zhubei (TW); Yanjun Xie, Wuhan (CN); Bin Lai, Fuzhou (CN); Chengzhi Wu, Quanzhou (CN)

(73) Assignee: TPK Touch Solutions (Xiamen) Inc., Xiamen (CN)

( * ) Notice: Subject to any disclaimer, the term of this patent is extended or adjusted under 35 U.S.C. 154(b) by 118 days.

(21) Appl. No.: 15/176,168

(22) Filed: Jun. 8, 2016

(65) Prior Publication Data

US 2016/0364593 A1 Dec. 15, 2016

(30) Foreign Application Priority Data

Jun. 10, 2015 (CN) .......................... 2015 1 0315728

(51) Int. Cl.
*G06K 9/00* (2006.01)
*G06F 3/041* (2006.01)
*G06F 3/044* (2006.01)

(52) U.S. Cl.
CPC .......... *G06K 9/0002* (2013.01); *G06F 3/044* (2013.01); *G06F 3/0416* (2013.01); *G06F 2203/04106* (2013.01); *G06F 2203/04111* (2013.01)

(58) Field of Classification Search
CPC ...... A61B 18/1206; A61B 2018/00767; A61B 2018/00892; G06F 2203/04106; G06F 2203/04111; G06F 3/0416; G06F 3/044; G06K 9/0002; H03F 1/0238; H03F 2200/138; H03F 3/2171; H03F 3/2178; H03F 3/45071

See application file for complete search history.

(56) References Cited

U.S. PATENT DOCUMENTS

| | | | |
|---|---|---|---|
| 2013/0135247 A1* | 5/2013 | Na | G06F 21/32 345/174 |
| 2017/0024597 A1* | 1/2017 | Cho | G06F 21/32 |
| 2017/0031514 A1* | 2/2017 | Kimura | G06F 3/044 |

FOREIGN PATENT DOCUMENTS

| CN | 103778410 | * | 5/2014 |
|---|---|---|---|
| CN | 15159506 | * | 12/2015 |

* cited by examiner

*Primary Examiner* — Kenneth Bukowski
(74) *Attorney, Agent, or Firm* — Cooper Legal Group, LLC

(57) ABSTRACT

A touch control apparatus with fingerprint identification function includes a substrate body with a visible region, a plurality of first primary electrodes, a plurality of second primary electrodes, and a fingerprint identification region located in the visible region. The first primary electrodes and the second primary electrodes are mounted in the visible region for sensing a touch coordinate when an object touches on the visible region. The first secondary electrodes are crossly arranged and insulated from the second secondary electrodes in the fingerprint, identification region. Further, a part of the first primary electrodes and the second primary electrodes are extended to the fingerprint identification region. When a user performs a fingerprint identification function, all electrodes in the fingerprint identification region are used to detect and identify the user's fingerprint.

19 Claims, 7 Drawing Sheets

TOUCH CONTROL APPARATUS WITH FINGERPRINT IDENTIFICATION FUNCTION

CROSS REFERENCE TO RELATED APPLICATIONS

This Application claims priority of China Patent Application No. CN201510315728.8, filed on Jun. 10, 2015, the entirety of which is incorporated by reference herein.

BACKGROUND OF THE DISCLOSURE

Field of the Disclosure

The present disclosure relates generally to capacitive touch control apparatuses, and more particularly to touch control apparatuses with fingerprint identification function.

Description of the Related Art

A touch panel is commonly used as an input and display interface of a handheld mobile device, and most of the touch panels are projective capacitive touch panels. In order to increase data confidentiality of the user, a specific authentication mechanism embedded in the handheld mobile device is provided to verify the identity of the user. For example, a password authentication is widely used to verify the identity of the user. That is, the user must enter the correct password to allow the user to use the handheld mobile device. However, it is inconvenient for the user to enter characters one by one, and the security of the authentication mechanism is decreased once the password is cracked or stolen.

Biometric identifiers, such as fingerprint, palm print, face, iris, and so on are unique and invariant to individuals. Also, related theoretical studies about biometric recognition techniques have been proposed and developed. Today, the fingerprint recognition technique is primarily applied to the handheld mobile devices.

An electronic apparatus disclosed in China Patent Application No. CN104021371A includes a visible region and a biometric feature recognition module. The biometric feature recognition module is formed in the visible region to provide the function of biometric feature recognition. A plurality of first electrode lines are arranged with intersections, and insulated from a plurality of second electrode lines in the visible region or the biometric, feature recognition module. The patent application discloses that the biometric feature recognition module may be formed in the visible region so that the user may operate the biometric feature recognition in the visible region. But the number of the first electrode lines and the second electrode lines arranged in the biometric feature recognition module is limited. The arrangement density of the electrode lines in the biometric feature recognition module is reduced to result in lower resolution and accuracy in the biometric feature recognition.

SUMMARY OF THE DISCLOSURE

Accordingly, the present disclosure provides a touch control apparatus with fingerprint identification function to locate a fingerprint, identification region in a visible region so that more electrodes are mounted in the fingerprint identification region to increase resolution and accuracy of the fingerprint identification.

In accordance with some embodiments of the present disclosure, the touch control apparatus with fingerprint identification function includes a substrate body a plurality of first primary electrodes and a plurality of second primary electrodes, and a fingerprint identification region. The substrate body has a visible region. The first primary electrodes are crossly arranged and insulated from the second primary electrodes in the visible region. The fingerprint identification region is located in the visible region, and a plurality of first secondary electrodes are crossly arranged and insulated from a plurality of second secondary electrodes in the fingerprint identification region. An arrangement density of the first secondary electrodes and the second secondary electrodes is higher than that of the first primary electrodes and the second primary electrodes.

By narrowing a line width of the first primary electrodes and a line width of the second primary electrodes in the fingerprint identification region, an area for arranging the first primary electrode and the second primary electrodes in the fingerprint, identification region is reduced. Accordingly, more of the first secondary electrodes and the second secondary electrodes may be formed in the fingerprint identification region to increase the arrangement density of the electrodes so as to improve resolution and accuracy of the fingerprint identification.

DETAILED DESCRIPTION

Figure 1:
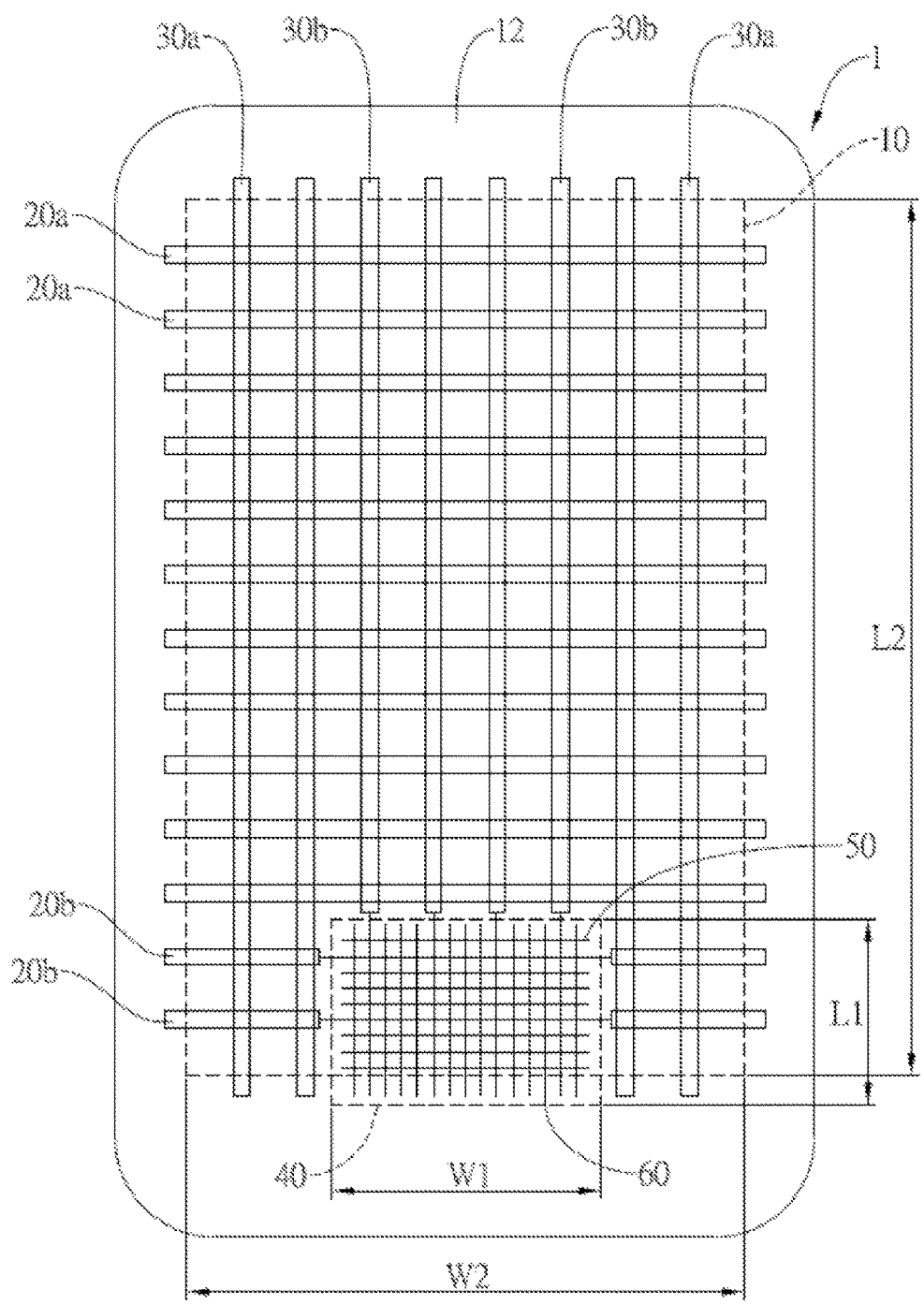
FIG. 1 is a schematic plan view of a touch control apparatus according to some embodiments of the present disclosure.

FIG. 1 shows a touch control apparatus of the present disclosure includes a substrate body 1, a plurality of first primary electrodes 20a, 20b and a plurality of second primary electrodes 30a, 30b in accordance with some embodiments.

The substrate body 1 may be composed of a single substrate or two substrates. The substrate body 1 has a visible region 10 and a non-visible region 12 located around at least one side of the visible region 10. The visible region 10 is surrounded by the non-visible region 12 in FIG. 1 as an example for further demonstration as follows. The plurality of the first primary electrodes 20a, 20b are extended along a first axial direction and arranged at intervals along a second axial direction in the visible region 10. The plurality of the second primary electrodes 30a, 30b are extended along the second axial direction and arranged at intervals along the first axial direction in the visible region 10. Also, the first primary electrodes 20a, 20b are crossly arranged and insulated from the second primary electrodes 30a, 30b. In particular, the first axial direction and the second axial direction are intersected at an angle. In one example, the first axial direction is orthogonal to the second axial direction. In some embodiments, the first primary electrodes 20a, 20b are used as driving electrodes (TX), and the second primary electrodes 30a, 30b are used as sensing electrodes (RX). Alternatively, the first primary electrodes 20a, 20b are the sensing electrodes (RX) and the second primary electrodes 30a, 30b are the driving electrodes (TX) in other embodiments. In the visible region 10, the first primary electrodes 20a, 20b are crossly arranged with the second primary electrodes 30a, 30b to form a touch control region for detecting touch operations of the user in the touch control region.

A fingerprint identification region 40 is located in the visible region 10, and the fingerprint identification region 40 is located at one side of the visible region 10. For example, the fingerprint, identification region 40 shown in FIG. 1 is located at a lower side of the visible region 10. An area of the fingerprint identification region 40 is less than that of the visible region 10, and an area ratio between the fingerprint identification region 40 and the visible region 10 is from 1:100 to 1:1. In addition, a width W1 of the fingerprint identification region 40 is less than a width W2 of the visible region 10, and a length L1 of the fingerprint identification region 40 is less than a length L2 of the visible region 10. A first primary electrode, extended to the fingerprint identification region 40, is referred to as a first primary electrode 20b. Similarly, a second primary electrode, extended to the fingerprint identification region 40, is referred to as a second primary electrode 30b.

Furthermore, a plurality of first secondary electrodes 50 and a plurality of second secondary electrodes 60 are formed in the fingerprint identification region 40. In particular, each of the first secondary electrodes 50 is arranged in parallel with the first primary electrodes 20a, 20b but in the absence of electrical connection to the first primary electrodes 20a, 20b, and multiple of the first secondary electrodes 50 are arranged at intervals between two adjacent first primary electrodes 20b. Also, each of the second secondary electrodes 60 is arranged in parallel with the second primary electrodes 30a,30b but in the absence of electrical connection to the second primary electrodes 30a,30b, and multiple of the second secondary electrodes 60 are arranged at intervals between two adjacent second primary electrodes 30a. The first secondary electrodes 50 cross and are insulated from the second secondary electrodes 60, and an arrangement density of the first secondary electrodes 50 and the second secondary electrodes 60 is higher than that of the first primary electrodes 20a,20b and the second primary electrodes 30a,30b. In the fingerprint identification region 40, a line width of each first secondary electrode 50 and a line width of each second secondary electrode 60 are less than or equal to a line with of each first primary electrode 20b and a line width of each second primary electrode 30b. In addition, a line spacing between two adjacent first secondary electrodes 50 is preferably from 30 micrometers to 200 micrometers; also a line spacing between two adjacent second secondary electrodes 60 is preferably from 30 micrometers to 200 micrometers. In this embodiment, the first secondary electrodes 50 are used as the driving electrodes (TX), and the second secondary electrodes 60 are used as the sensing electrodes (RX), respectively.

Figure 2:
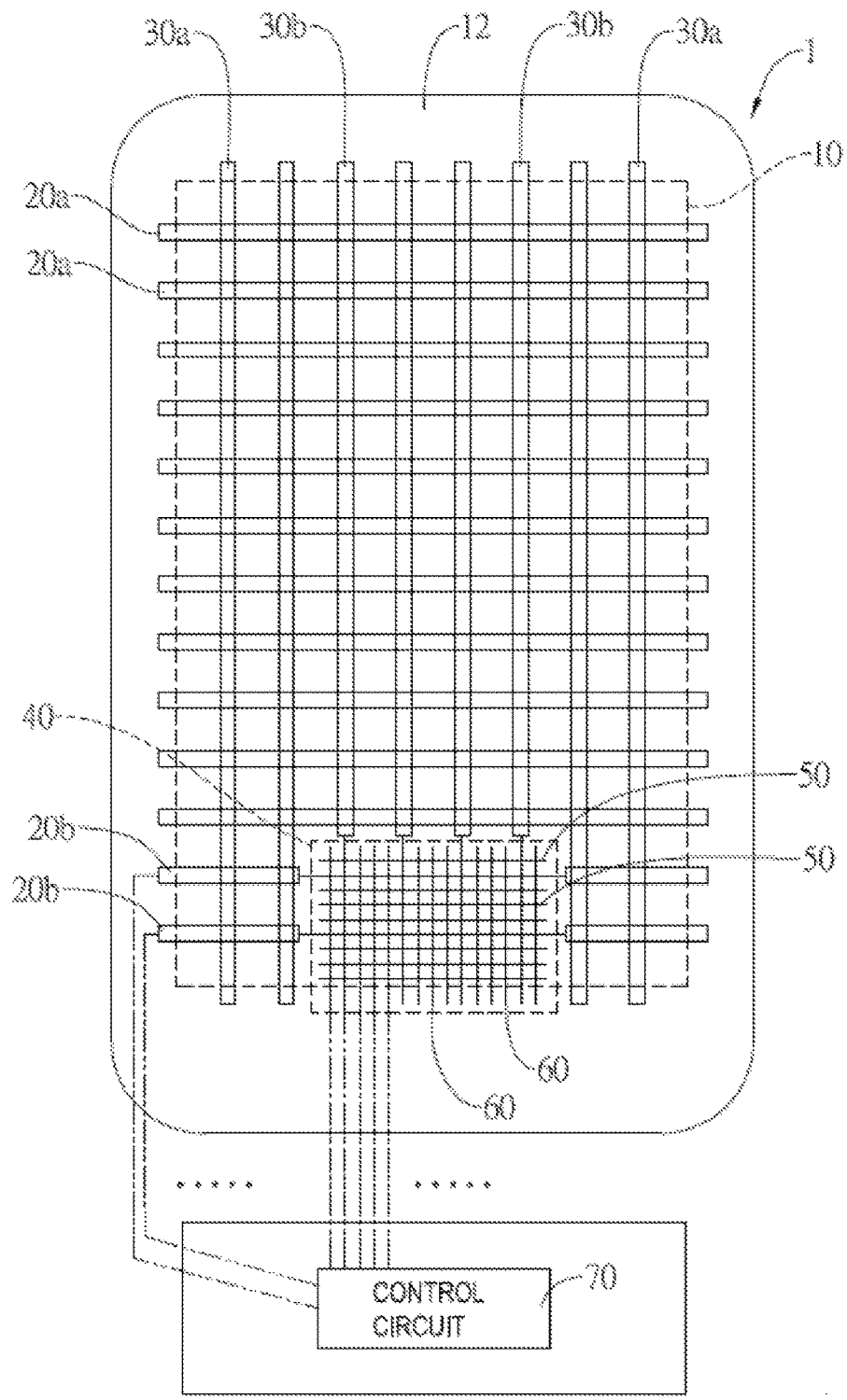
FIG. 2 is a schematic view of the touch control apparatus with one control circuit according to some embodiments of the present disclosure.

FIG. 2 shows that the first primary electrodes 20a,20b, the second primary electrodes 30a,30b, the first secondary electrodes 50, and the second secondary electrodes 60 may be electrically connected to the same control circuit 70. The control circuit 70 may be an integrated circuit (IC) for executing touch coordinate calculation and fingerprint identification. The first primary electrodes 20a,20b and the second primary electrodes 30a,30b mounted on the substrate body 1 are electrically connected to the control circuit 70. The control circuit 70 may be mounted either on the substrate body 1 or on a separate circuit board electrically connected to the first primary electrodes 20a,20b and the second primary electrodes 30a,30b through a flexible circuit board.

Figure 3:
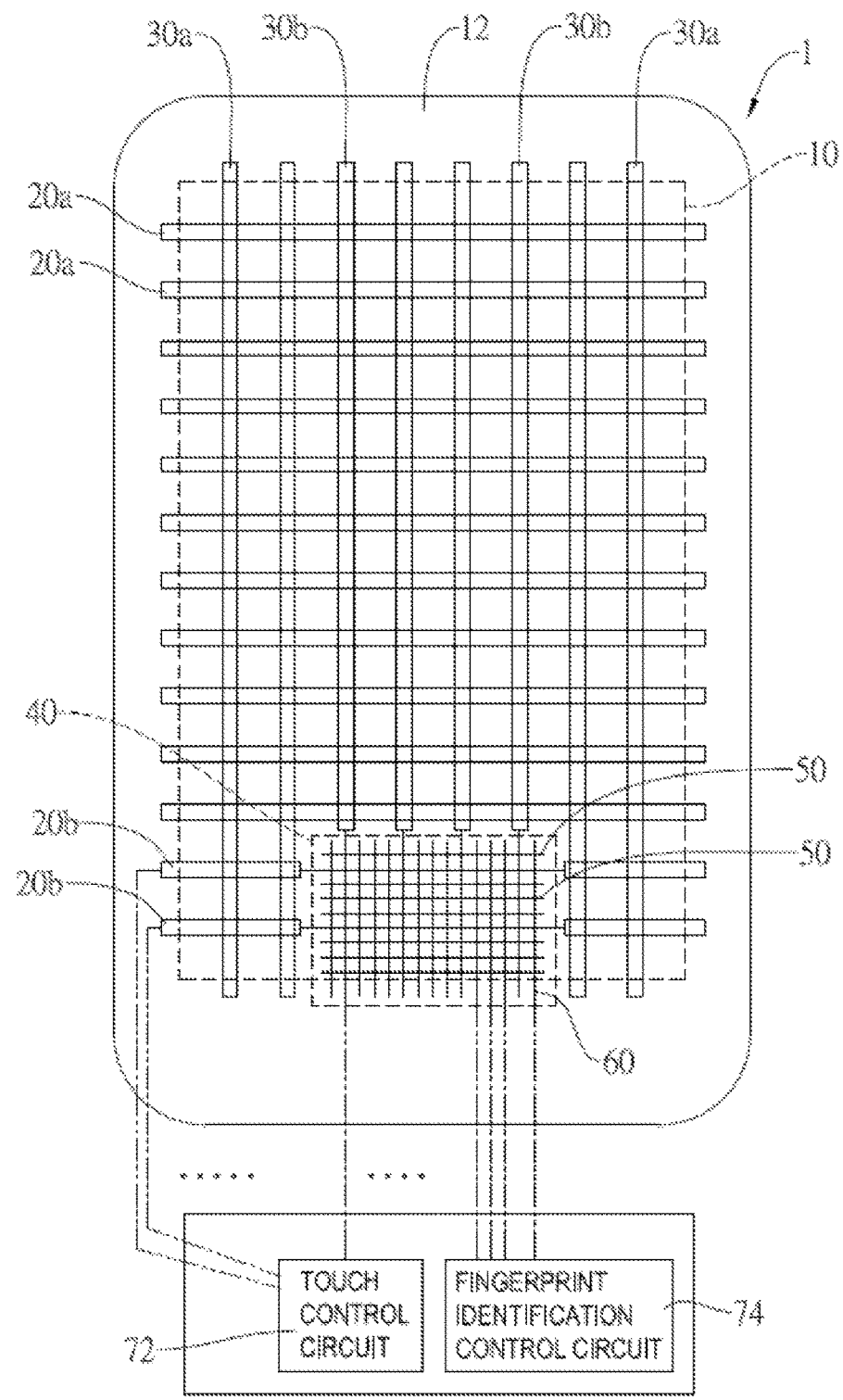
FIG. 3 is a schematic view of the touch control apparatus with two control circuits according to some embodiments of the present disclosure.

FIG. 3 shows that the first primary electrodes 20a,20b and the second primary electrodes 30a,30b are electrically connected to a touch control circuit 72. The touch control circuit may be an integrated circuit (IC) for executing touch coordinate calculation or equivalent operations. In addition, the first secondary electrodes 50 and the second secondary electrodes 60 are electrically connected to a fingerprint identification control circuit 74 which is distinct from the touch control circuit 72. The fingerprint identification control circuit 74 may be an integrated circuit (IC) for executing fingerprint identification. In particular, the touch control circuit 72 and the fingerprint identification control circuit 74 may be mounted on either the substrate body 1 or a separate circuit board.

The touch control apparatus may provide a touch control mode and a fingerprint identification mode since the fingerprint identification region 40 is integrated into the visible region 10. A smartphone is exemplified for further demonstration as follows. The touch control mode is executed when a user ordinarily operates the smartphone. Alternatively, the fingerprint identification mode is executed to identify a user's identity when the smartphone is rebooted or a sleep mode of the smartphone is terminated by the user. In the touch control mode, the first primary electrodes 20a,20b in the visible region 10 are driven by the control circuit 70 shown in FIG. 2 or the touch control circuit 72 shown in FIG. 3, and then sensed data at the second primary electrodes 30a,30b are read by the control circuit 70 or the touch control circuit 72. Whether an object touches on the visible region 10 is determined, and touch coordinates of the object are generated according to the read sensed data. In the touch control mode, the first primary electrodes 20a,20b and the second primary electrodes 30a,30b are in the operating condition; however, the first secondary electrodes 50 and the second secondary electrodes 60 are in the non-operating condition.

In the fingerprint identification mode, the first secondary electrodes 50 and the second secondary electrodes 60 are in the operating condition, and the first primary electrodes 20b and the second primary electrodes 30b in the fingerprint identification region 40 are also in the operating condition. On the contrary, the first primary electrodes 20a and the second primary electrodes 30a out of the fingerprint identification region 40 are in the non-operating condition. As shown in FIG. 2, the control circuit 70 is used to control the electrodes in the fingerprint identification region 40, including the first secondary electrodes 50, the second secondary electrodes 60, and the first primary electrodes 20b and the second primary electrodes 30b in the fingerprint identification region 40 so as to identify the fingerprint of the user according to the sensed data. As shown in FIG. 3, the touch control circuit 72 and the fingerprint identification control circuit 74 are used in conjunction to jointly control the electrodes in the fingerprint identification region 40 so as to identify the fingerprint of the user according to the sensed data. In particular, the touch control circuit 72 transmits the sensed data to the fingerprint identification control circuit 74, and then the fingerprint identification control circuit 74 analyzes the sensed data.

In some embodiments, the line width of the first primary electrodes 20a is equal to that of the second primary electrodes 30a. However, the line width of the first primary electrodes 20b in the fingerprint identification region 40 is different from that of the first primary electrodes 20b outside of the fingerprint identification region 40. Also, the line width of the second primary electrodes 30b in the fingerprint identification region 40 is different from that of the second primary electrodes 30b outside of the fingerprint identification region 40. More specifically, each of the first primary electrodes 20b has a first line segment with a first line width and at least one second line segment with a second line width connected to the first line segment. The first line segment is in the fingerprint identification region 40 and the at least one second line segment is outside of the fingerprint identification region 40. In particular, the second line width is greater than the first line width. In one embodiment, a ratio between the first line width and the second line width is from 1:10 to 9:10. Further, the first line width is from 0.01 micrometers to 200 micrometers, or the second line width is from 1 micrometer to 2 millimeters.

Figure 4:
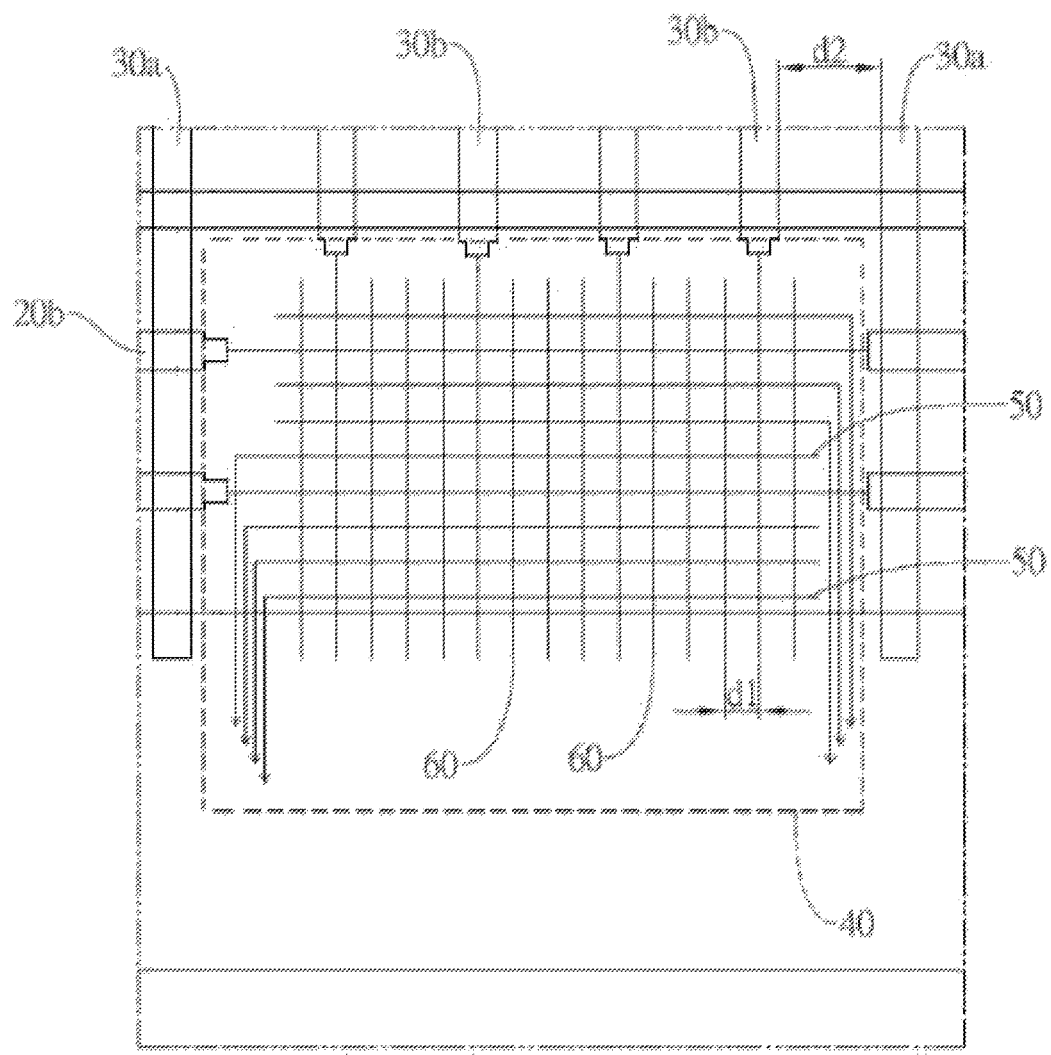
FIG. 4 is a schematic view of arranging first secondary electrodes according to some embodiments of the present disclosure.

By narrowing the line width of the electrodes in the fingerprint identification region 40, occupied area of the first primary electrode 20b and the second primary electrodes 30b is reduced in the fingerprint identification region 40. Accordingly, more of the first secondary electrodes 50 and the second secondary electrodes 60 may be mounted in the fingerprint identification region 40 to increase the arrangement density of electrodes so as to increase resolution and accuracy of the fingerprint identification. FIG. 4 shows different arrangement densities of the electrodes in different regions. A first distance d1 is defined between two adjacent first secondary electrodes 50 and also defined between two adjacent second secondary electrodes 60 in the fingerprint identification region 40. In addition, a second distance d2 is defined between the first primary electrode 20a and the first primary electrode 20b and also defined between the second primary electrode 30a and the second primary electrode 30b outside of the fingerprint identification region 40. A ratio between the first distance d1 and the second distance d2 is from 1:50 to 1:100.

In order to achieve the identical electrical characteristics between the first primary electrodes 20b and the first primary electrodes 20a, a compensation mechanism is provided because of the varied line width of the first primary electrodes 20b. Similarly, the compensation mechanism is also provided to achieve the identical electrical characteristics between the second primary electrodes 30b and the second primary electrodes 30a because of the varied line width of the second primary electrodes 30b. The first type of the compensation mechanism may be implemented by software compensation. A compensation algorithm, stored in the control circuit 70 shown in FIG. 2 or in the touch control circuit 72 shown in FIG. 3, is provided to calculate and compensate the required sensed amount according to the sensed data so that the total sensed amount is not reduced despite the narrower line width. The second type of the compensation mechanism may be implemented by auxiliary electrode compensation. When the first primary electrodes 20b and/or the second primary electrodes 30b are in the operating condition, the adjacent first secondary electrodes 50 and/or the second secondary electrodes 60 thereof are used as the auxiliary electrodes for the first primary electrodes 20b and/or the second primary electrodes 30b, respectively. In other words, when one first primary electrode 20b is driven, three electrodes, including the driven first primary electrode 20b and two adjacent first secondary electrodes 50, are simultaneously driven so that the sensed data of the driven first primary electrode 20b and the two adjacent first secondary electrodes 50 are received to enhance strength of driving signals and sensing signals since the number of the activated driving or sensing, electrodes is increased. Similarly, when one second primary electrode 30b is driven, three electrodes, including the driven second primary electrode 30b and two adjacent second secondary electrodes 60, are simultaneously driven so that the sensed data of the driven second primary electrode 30b and the two adjacent second secondary electrodes 60 are received to enhance strength of driving signals and sensing signals since the number of the activated driving or sensing electrodes is increased.

FIG. 4 shows that a plurality of first secondary electrodes 50 may be arranged in a blank area of the fingerprint identification region 40. A left or right end of each first secondary electrode 50 is downwardly extended to the non-visible region 12 by connecting a conducting wire and then the first secondary electrodes 50 are electrically connected to the control circuit 70 or the fingerprint identification control circuit 74. A lower end of the each second secondary electrode 60 is electrically connected to the control circuit 70 or the fingerprint identification control circuit 74 through conducting wires.

Figure 5:
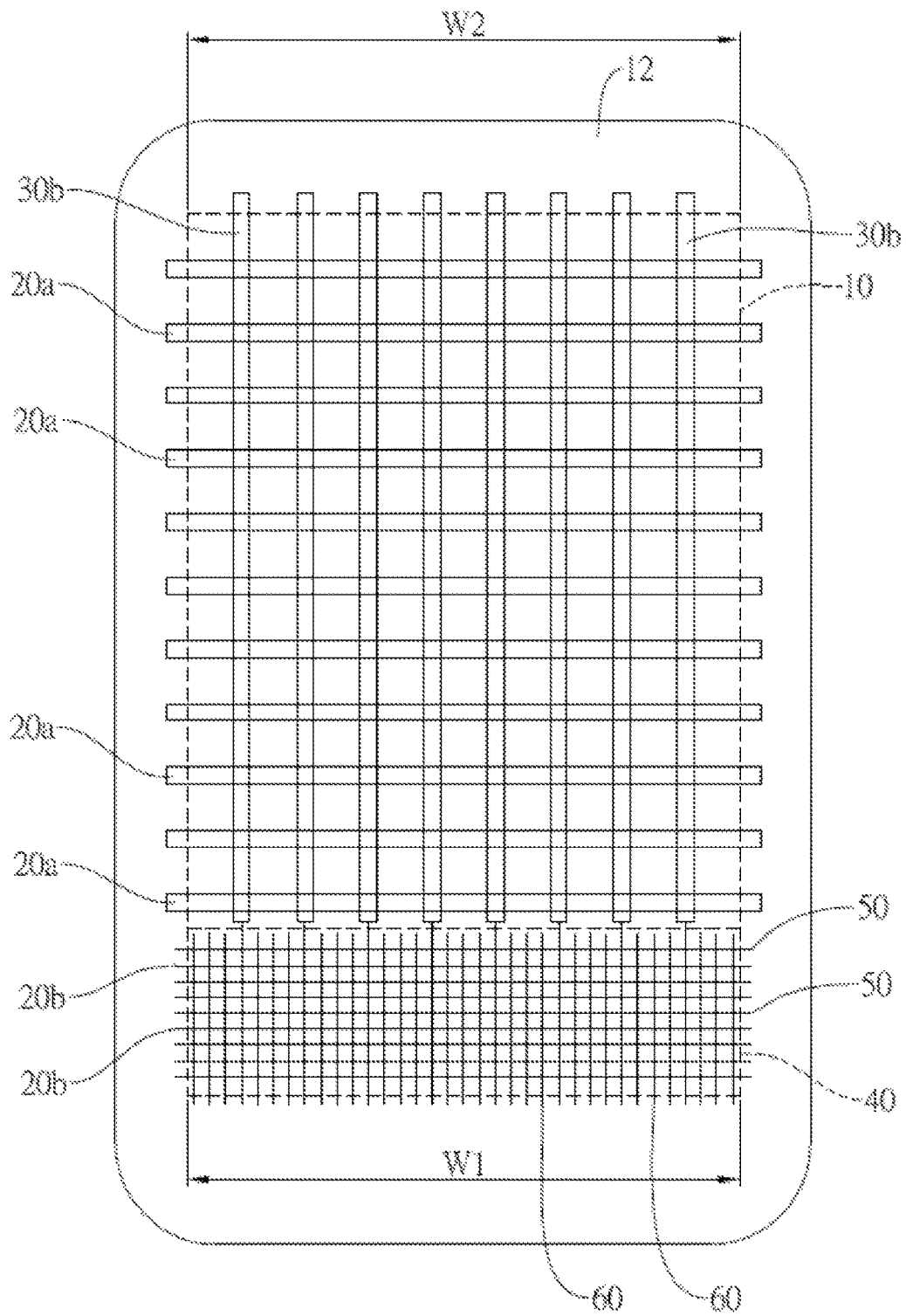
FIG. 5 is a schematic plan view of the touch control apparatus according to some embodiments of the present disclosure.

The major difference between the embodiment shown in FIG. 4 and the embodiment shown in FIG. 5 is that a width W1 of the fingerprint identification region 40 is equal to a width W2 of the visible region 10 and a length L1 of the fingerprint identification region 40 is less than a length L2 of the visible region 10 in the second embodiment. Accordingly, it is more convenient and user-friendly for the user to execute the fingerprint identification mode in the fingerprint identification region 40 because of the enlarged fingerprint identification region 40.

Figure 6:
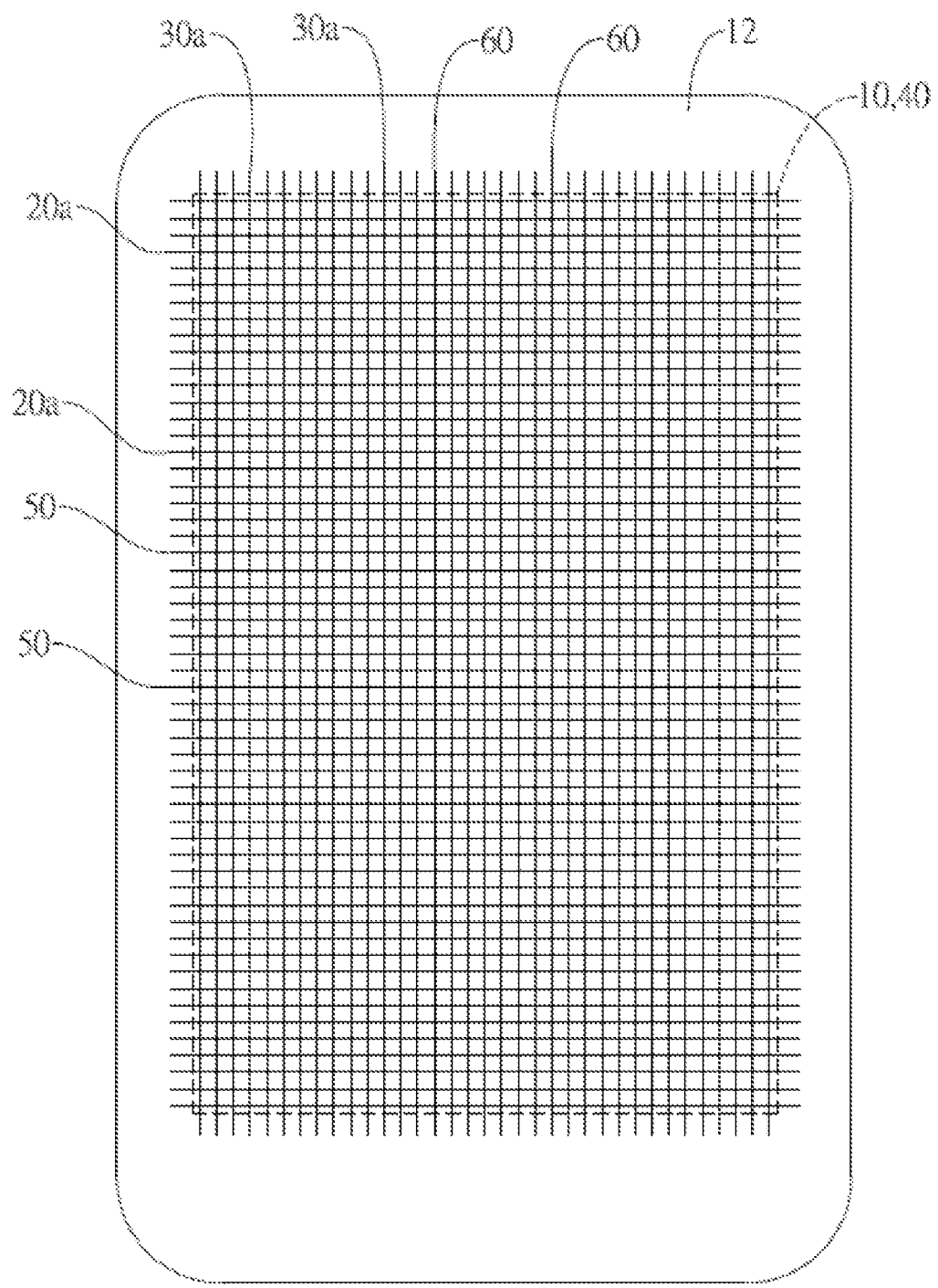
FIG. 6 is a schematic plan view of the touch control apparatus according to some embodiments of the present disclosure.

The major difference between the embodiment shown in FIG. 5 and the embodiment shown in FIG. 6 is that the whole visible region 10 is occupied by the fingerprint identification region 40 in the third embodiment so that the user may operate the fingerprint identification mode at any position on the visible region 10. The first primary electrodes 20a cross and are insulated from the second primary electrodes 30a in the visible region 10. A plurality of first secondary electrodes 50 are arranged at intervals between two adjacent first primary electrodes 20a; also, a plurality of second secondary electrodes 60 are arranged at intervals between two adjacent second primary electrodes 30a. In particular, an arrangement density of the first secondary electrodes 50 is higher than that of the first primary electrodes 20a; also an arrangement density of the second secondary electrodes 60 is higher than that of the second primary electrodes 30a. In addition, a line width of each first secondary electrode 50 and a line width of each second secondary electrode 60 are less than a line width of each first primary electrode 20a and a line width of each second primary electrode 30a. Accordingly, by narrowing the line width of the first secondary electrodes 50 and the second secondary electrodes 60, the first secondary electrodes 50 between two first primary electrodes 20a are increased and the second secondary electrodes 60 between two second primary electrodes 30a are increased, so as to increase resolution and accuracy of the fingerprint identification.

In the touch control mode, the first primary electrodes 20a and the second primary electrodes 30a are in the operating condition; however, the first secondary electrodes 50 and the second secondary electrodes 60 are in the non-operating condition so as to reduce power consumption. In the fingerprint identification mode, all of the electrodes, including the first primary electrodes 20a, the second primary electrodes 30a, the first secondary electrodes 50, and the second secondary electrodes 60 are in the operating condition for detecting the user's fingerprint appearing in the visible region 10.

Figure 7:
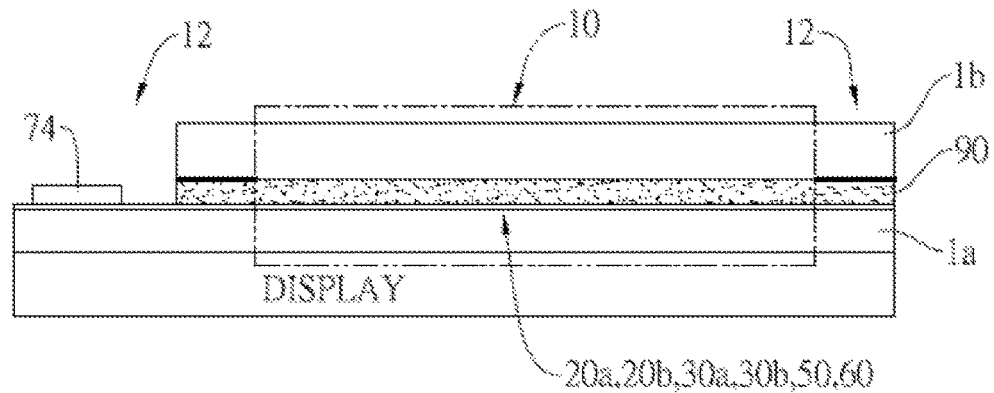
FIG. 7 is a schematic side structural view of a substrate body of the touch control apparatus according to some embodiments of the present disclosure.
Figure 8:
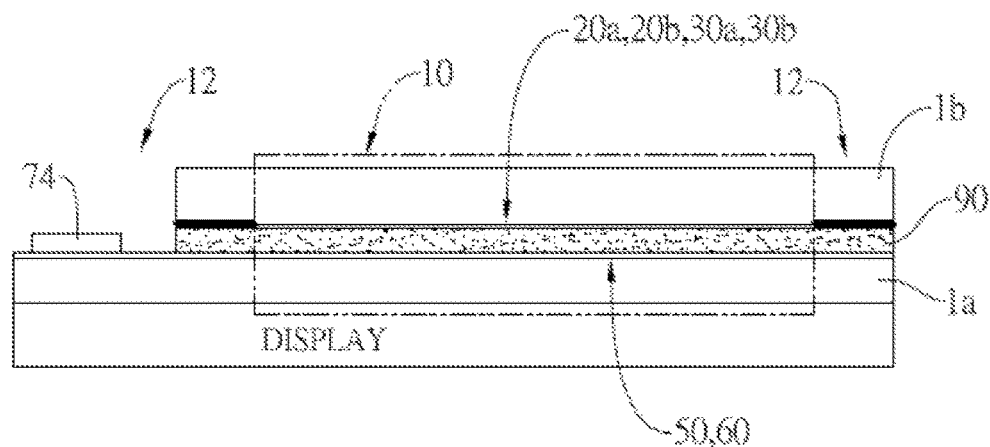
FIG. 8 is a schematic side structural view of the substrate body of the touch control apparatus according to some embodiments of the present disclosure.

FIG. 7 and FIG. 8 show a vertical layer relationship between the first primary electrodes 20a,20b, the second primary electrodes 30a,30b, the first secondary electrodes 50, and the second secondary electrodes 60. A substrate body 1 with a lower substrate 1a and an upper substrate 1b, such as a cover glass, is exemplified for further demonstration as follows. The first secondary electrodes 50 and the second secondary electrodes 60 are formed on a surface of the lower substrate 1a and electrically connected to the fingerprint identification control circuit 74 mounted on the surface of the lower substrate 1a. The fingerprint identification control circuit 74, the first secondary electrode 50, and the second secondary electrode 60 are mounted on the same level with the surface of the lower substrate 1a so as to shorten the signal transmission path, reduce the signal attenuation, and increase accuracy of the fingerprint identification. The first primary electrodes 20a,20b and the second primary electrodes 30a,30b may be all formed either on the lower substrate 1a (as shown in FIG. 7) or on the upper substrate 1b (as show in FIG. 8). In addition, the first primary electrodes 20a, 20b and the second primary electrodes 30a, 30b may be separately mounted on the lower substrate 1a and the upper substrate 1b, respectively. Also, the upper substrate 1b is correspondingly adhered with the lower substrate 1a by an optically clear adhesive 90.

Figure 9:
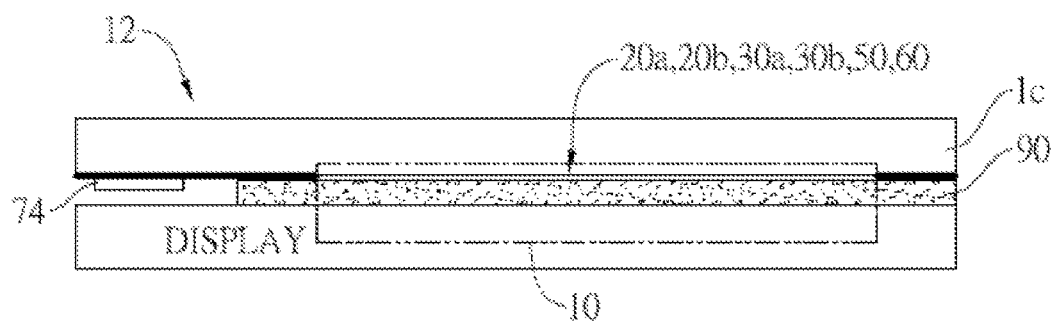
FIG. 9 is a schematic side structural view of the substrate body of the touch control apparatus according to some embodiments of the present disclosure.

FIG. 9 shows that the substrate body 1 may be composed of a single-sided substrate 1c, and the first primary electrodes 20a, 20b, the second primary electrodes 30a, 30b, the first secondary electrodes 50, and the second secondary electrodes 60 are jointly mounted on one surface of the substrate 1c. Also, the user directly performs the touch operation on the other surface of the substrate 1c. The fingerprint identification control circuit 74 and all of the electrodes are mounted on the same level with the surface of the substrate 1c. In particular, the fingerprint identification control circuit 74 is mounted in the non-visible region 12, however, all of the electrodes are mounted in the visible region 10. The major difference between the embodiments shown in FIG. 7 and FIG. 8 and the third embodiment shown in FIG. 9 is that only one substrate 1c is used in the third embodiment instead of the two substrates 1a, 1b so that the touch control apparatus is lighter and narrower because of the absence of one substrate. In addition, the first secondary electrodes 50, the second secondary electrodes 60, the first primary electrodes 20b, and the second primary electrodes 30b are directly mounted on one surface of the substrate 1c for detecting the user's fingerprint. Also, the other surface of the substrate 1c is provided for executing the touch operation. Accordingly, the distance between the electrodes and the object touching on the fingerprint identification region 40 is shorter to increase the sensitivity of the fingerprint identification.

In conclusion, the fingerprint identification function is implemented in the visible region of the substrate body so that the user may directly operate the fingerprint identification mode in the visible region instead of being limited in the non-visible region. The narrower line width of the first primary electrodes and the second primary electrodes in the fingerprint identification region may reduce the occupied wiring area and arrange more of the first secondary electrodes and the second secondary electrodes so as to increase resolution and accuracy of the fingerprint identification. In either the touch control mode or the fingerprint identification mode, only the corresponding electrodes are driven to be in the operating condition so as to reduce power consumption.

Although the present disclosure has been described with reference to the preferred embodiment thereof it will be understood that the present disclosure is not limited to the details thereof. Various substitutions and modifications have been suggested in the foregoing description, and others will occur to those of ordinary skill in the art. Therefore, all such substitutions and modifications are intended to be embraced within the scope of the present disclosure as defined in the appended claims.

What is claimed is:

1. A touch control apparatus with fingerprint identification function, comprising:
   a substrate body having a visible region;
   a plurality of first primary electrodes crossing and insulated from a plurality of second primary electrodes in the visible region; and
   a fingerprint identification region located in the visible region, wherein:
      a plurality of first secondary electrodes cross and are insulated from a plurality of second secondary electrodes in the fingerprint identification region,
      each of the first secondary electrodes is arranged in parallel with the first primary electrodes,
      there is no electrical connection between the first primary electrodes and the first secondary electrodes,
      each of the second secondary electrodes is arranged in parallel with the second primary electrodes,
      there is no electrical connection between the second primary electrodes and the second secondary electrodes,
      an arrangement density of the first secondary electrodes and the second secondary electrodes is higher than an arrangement density of the first primary electrodes and the second primary electrodes,
      a portion of at least some of the first primary electrodes and a portion of at least some of the second primary electrodes are present in the fingerprint identification region,
      a line width of each portion of the at least some of the first primary electrodes present in the fingerprint identification region is less than a line width of a second portion of each of the at least some of the first primary electrodes not present in the fingerprint identification region,
      a line width of each portion of the at least some of the second primary electrodes present in the fingerprint identification region is less than a line width of a second portion of each of the at least some of the second primary electrodes not present in the fingerprint identification region, and
      a line width of each first secondary electrode is less than the line width of each portion of the at least some of the first primary electrodes present in the fingerprint identification region, and a line width of each second secondary electrode is less than the line width of each portion of the at least some of the second primary electrodes present in the fingerprint identification region.

2. The touch control apparatus with fingerprint identification function in claim 1, wherein:
a line spacing between two adjacent first secondary electrodes of the first secondary electrodes corresponds to a first distance,
a line spacing between two adjacent second secondary electrodes of the second secondary electrodes corresponds to the first distance,
a line spacing between two adjacent first primary electrodes of the first primary electrodes corresponds to a second distance,
a line spacing between two adjacent second primary electrodes corresponds to the second distance,
a ratio between the first distance and the second distance is from 1:50 to 1:100.

3. The touch control apparatus with fingerprint identification function in claim 1, wherein:
a line spacing between two adjacent first secondary electrodes of the first secondary electrodes is from 30 micrometers to 200 micrometers, and
a line spacing between two adjacent second secondary electrodes of the second secondary electrodes is from 30 micrometers to 200 micrometers.

4. The touch control apparatus with fingerprint identification function in claim 1, wherein:
multiple of the first secondary electrodes are arranged at intervals between two adjacent first primary electrodes, and
multiple of the second secondary electrodes are arranged at intervals between two adjacent second primary electrodes.

5. The touch control apparatus with fingerprint identification function in claim 1, wherein:
each of the first primary electrodes having a portion present in the fingerprint identification region and a second portion not present in the fingerprint identification region or each of the second primary electrodes having a portion present in the fingerprint identification region and a second portion not present in the fingerprint identification region comprises:
a first line segment with a first line width present in the fingerprint identification region; and
a second line segment with a second line width not present in the fingerprint identification region and connected to the first line segment, and
the second line width is greater than the first line width.

6. The touch control apparatus with fingerprint identification function in claim 5, wherein a ratio between the first line width and the second line width is from 1:10 to 9:10.

7. The touch control apparatus with fingerprint identification function in claim 6, wherein the first line width is from 0.01 micrometers to 200 micrometers, and the second line width is from 1 micrometer to 2 millimeters.

8. The touch control apparatus with fingerprint identification function in claim 1, wherein:
an area of the fingerprint identification region is less than an area of the visible region, and
the fingerprint identification region is located at one side of the visible region.

9. The touch control apparatus with fingerprint identification function in claim 1, wherein the first primary electrodes, the second primary electrodes, the first secondary electrodes, and the second secondary electrodes are electrically connected to a control circuit.

10. The touch control apparatus with fingerprint identification function in claim 1, wherein:
the first primary electrodes and the second primary electrodes are electrically connected to a touch control circuit, and
the first secondary electrodes and the second secondary electrodes are electrically connected to a fingerprint identification control circuit.

11. The touch control apparatus with fingerprint identification function in claim 10, wherein:
when the first primary electrode is driven, two of the first secondary electrodes adjacent to the first primary electrode being driven are simultaneously driven, and
when the second primary electrode is driven, two of the second secondary electrodes adjacent to the second primary electrode being driven are simultaneously driven.

12. The touch control apparatus with fingerprint identification function in claim 10, wherein:
the substrate body includes a lower substrate and an upper substrate-adhered with the lower substrate, and
the fingerprint identification control circuit, the first secondary electrodes, and the second secondary electrodes are disposed on a surface of the lower substrate facing the upper substrate.

13. The touch control apparatus with fingerprint identification function in claim 12, wherein the first primary electrodes and the second primary electrodes are disposed on a surface of the upper substrate facing the lower substrate.

14. The touch control apparatus with fingerprint identification function in claim 10, wherein:
the substrate body includes a lower substrate and an upper substrate adhered with the lower substrate, and
the fingerprint identification control circuit, the first primary electrodes, the second primary electrodes, the first secondary electrodes, and the second secondary electrodes are disposed on a surface of the lower substrate facing the upper substrate.

15. The touch control apparatus with fingerprint identification function in claim 10, wherein:
the substrate body is a single substrate, and
the fingerprint identification control circuit, the first primary electrodes, the second primary electrodes, the first secondary electrodes, and the second secondary electrodes are disposed on a surface of the single substrate.

16. A touch control apparatus with fingerprint identification function, comprising:
a substrate body having a visible region;
a plurality of first primary electrodes crossing and insulated from a plurality of second primary electrodes in the visible region;
a fingerprint identification region located in the visible region, wherein:
a plurality of first secondary electrodes cross and are insulated from a plurality of second secondary electrodes in the fingerprint identification region,
each of the first secondary electrodes is arranged in parallel with the first primary electrodes,
there is no electrical connection between the first primary electrodes and the first secondary electrodes,
each of the second secondary electrodes is arranged in parallel with the second primary electrodes,
there is no electrical connection between the second primary electrodes and the second secondary electrodes, an arrangement density of the first secondary electrodes and the second secondary electrodes is higher than an arrangement density of the first primary electrodes and the second primary electrodes, a portion of at least some of the first primary electrodes and a portion of at least some of the second primary electrodes are present in the fingerprint identification region, a line width of each portion of the at least some of the first primary electrodes present in the fingerprint identification region is less than a line width of a second portion of each of the at least some of the first primary electrodes not present in the fingerprint identification region, a line width of each portion of the at least some of the second primary electrodes present in the fingerprint identification region is less than a line width of a second portion of each of the at least some of the second primary electrodes not present in the fingerprint identification region; and a circuit configured to:

when the first primary electrode is driven, two of the first secondary electrodes adjacent to the first primary electrode being driven are simultaneously driven, and when the second primary electrode is driven, two of the second secondary electrodes adjacent to the second primary electrode being driven are simultaneously driven;

wherein a line width of each first secondary electrode is less than the line width of each portion of the at least some of the first primary electrodes present in the fingerprint identification region, and a line width of each second secondary electrode is less than the line width of each portion of the at least some of the second primary electrodes present in the fingerprint identification region.

17. The touch control apparatus with fingerprint identification function in claim 16, wherein the circuit comprises a control circuit to which the first primary electrodes, the second primary electrodes, the first secondary electrodes, and the second secondary electrodes are electrically connected.

18. The touch control apparatus with fingerprint identification function in claim 16, wherein the circuit comprises:
a touch control circuit electrically connected to the first primary electrodes and the second primary electrodes; and
a fingerprint identification control circuit electrically connected to the first secondary electrodes and the second secondary electrodes.

19. The touch control apparatus with fingerprint identification function in claim 16, wherein multiple of the first secondary electrodes are arranged at intervals between two adjacent first primary electrodes.

* * * * *